United States Patent
Lubachevsky et al.

(10) Patent No.: US 12,289,352 B2
(45) Date of Patent: *Apr. 29, 2025

(54) SYSTEM AND METHOD FOR IMPLEMENTING A CLOUD-TO-ENTERPRISE VOICE APPLICATION GATEWAY

(71) Applicant: Bank of America Corporation, Charlotte, NC (US)

(72) Inventors: Samuel Lubachevsky, Pennington, NJ (US); Todd M. Goodyear, Pennington, NJ (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/534,134

(22) Filed: Dec. 8, 2023

(65) Prior Publication Data

US 2024/0106872 A1   Mar. 28, 2024

Related U.S. Application Data

(63) Continuation of application No. 17/557,783, filed on Dec. 21, 2021, now Pat. No. 11,895,162.

(51) Int. Cl.
| | |
|---|---|
| *G06F 15/16* | (2006.01) |
| *H04L 65/1069* | (2022.01) |
| *H04L 65/1104* | (2022.01) |
| *H04M 3/51* | (2006.01) |
| *H04M 3/523* | (2006.01) |

(52) U.S. Cl.
CPC ...... *H04L 65/1069* (2013.01); *H04L 65/1104* (2022.05); *H04M 3/5183* (2013.01); *H04M 3/523* (2013.01)

(58) Field of Classification Search
CPC .................. H04L 65/1069; H04L 65/1104
See application file for complete search history.

(56) References Cited

U.S. PATENT DOCUMENTS

| | | | |
|---|---|---|---|
| 6,665,723 B2 | 12/2003 | Trossen | |
| 6,731,609 B1 * | 5/2004 | Hirni | ................... H04L 12/1813 370/260 |
| 7,154,864 B2 | 12/2006 | Costa-Requena et al. | |
| 7,408,925 B1 | 8/2008 | Boyle et al. | |
| 7,484,240 B2 | 1/2009 | Faccin et al. | |
| 7,580,419 B2 | 8/2009 | Hsu | |
| 7,616,752 B2 | 11/2009 | Onorato | |
| 7,710,950 B2 | 5/2010 | Buckley et al. | |
| 7,738,445 B2 | 6/2010 | Ibezim et al. | |
| 7,738,644 B2 | 6/2010 | Brannick et al. | |
| 7,751,359 B1 | 7/2010 | Bienn et al. | |
| 7,778,404 B2 | 8/2010 | Caballero-Mccann et al. | |
| 7,899,175 B2 | 3/2011 | Caballero-Mccann et al. | |

(Continued)

*Primary Examiner* — Yves Dalencourt

(57) ABSTRACT

A system for establishing a network communication between two or more users receives a request to establish a call between an endpoint device associated with a user and user equipment (UE) associated with a client. The system determines that the endpoint device is available for a call by querying a network node configured to route calls to the endpoint device. The system routes a first call to the endpoint device. The system routes a second call to the UE. The system establishes a call between the user and the client by merging the first call and the second call.

20 Claims, 3 Drawing Sheets

(56) References Cited

U.S. PATENT DOCUMENTS

| | | |
|---|---|---|
| 7,907,599 B2 | 3/2011 | Hardie et al. |
| 7,966,625 B2 | 6/2011 | Gilfix et al. |
| 8,121,282 B1 | 2/2012 | Zhuang et al. |
| 8,194,838 B2 | 6/2012 | McMurry et al. |
| 8,199,727 B1 | 6/2012 | Bienn et al. |
| 8,208,461 B2 | 6/2012 | Mitchell |
| 8,243,715 B2 | 8/2012 | Itzkovitz et al. |
| 8,300,632 B2 | 10/2012 | Davis et al. |
| 8,364,828 B2 | 1/2013 | Samavedam et al. |
| 8,369,311 B1 | 2/2013 | Kirchhoff et al. |
| 8,462,768 B2 | 6/2013 | Badger |
| 8,599,838 B2 | 12/2013 | Buckley |
| 8,750,291 B2 | 6/2014 | Balasaygun et al. |
| 8,750,467 B2 | 6/2014 | Philps et al. |
| 8,761,382 B2 | 6/2014 | Pollitt |
| 9,019,869 B2 | 4/2015 | Thorpe, III et al. |
| 9,350,769 B2 | 5/2016 | Smith et al. |
| 9,357,078 B2 | 5/2016 | Mitchell |
| 9,712,341 B2 | 7/2017 | Nas |
| 10,798,134 B2 | 10/2020 | Sinha et al. |
| 11,895,162 B2 * | 2/2024 | Lubachevsky ........ H04M 3/523 |
| 2003/0058838 A1 | 3/2003 | Wengrovitz |
| 2005/0105464 A1 | 5/2005 | Acharya et al. |
| 2005/0141689 A1 | 6/2005 | Wengrovitz |
| 2005/0180435 A1 | 8/2005 | Hsu |
| 2005/0227685 A1 | 10/2005 | Costa Requena et al. |
| 2007/0036144 A1 | 2/2007 | Raghav et al. |
| 2007/0091870 A1 | 4/2007 | Hsu et al. |
| 2007/0297599 A1 | 12/2007 | Sylvain |
| 2008/0239998 A1 | 10/2008 | Ogami et al. |
| 2008/0267171 A1 | 10/2008 | Buckley et al. |
| 2008/0310312 A1 | 12/2008 | Acharya et al. |
| 2009/0003321 A1 | 1/2009 | Bian et al. |
| 2010/0040049 A1 | 2/2010 | Benedyk et al. |
| 2010/0183002 A1 | 7/2010 | Gallant et al. |
| 2013/0138821 A1 | 5/2013 | Robbins |
| 2016/0242016 A1 | 8/2016 | Mitchell |
| 2017/0078456 A1 | 3/2017 | Navare et al. |
| 2018/0132291 A1 | 5/2018 | Kalepu et al. |

* cited by examiner

SYSTEM AND METHOD FOR IMPLEMENTING A CLOUD-TO-ENTERPRISE VOICE APPLICATION GATEWAY

CROSS-REFERENCE TO RELATED APPLICATION

The application is a continuation of U.S. patent application Ser. No. 17/557,783, filed Dec. 21, 2021, entitled "SYSTEM AND METHOD FOR IMPLEMENTING A CLOUD-TO-ENTERPRISE VOICE APPLICATION GATEWAY," which is incorporated herein by reference.

TECHNICAL FIELD

The present disclosure relates generally to telecommunication systems, and more specifically to a system and method for implementing a cloud-to-enterprise voice application gateway.

BACKGROUND

An organization may use services of an external cloud service provider to route calls among users and clients. For example, a request to route a call to a client may be initiated from a user associated with the organization. The cloud service provider uses its respective internet service provider and voice carrier provider to route the call from the user's device to the client's device. The service provider's internet service provider and voice carrier provider are external with respect to the organization. The organization has no control over which internet service provider or voice carrier provider is to be used to route the call.

SUMMARY

The system described in the present disclosure is integrated into a practical application of routing calls (e.g., a voice over internet protocol (VoIP) calls, session initiation protocol (SIP) calls) between two or more users. In particular, the system described in the present disclosure is integrated into a practical application of routing SIP calls between endpoint devices internal with respect to an organization and endpoint devices external with respect to the organization without using external internet service providers and external voice carrier providers. As such, technology disclosed herein improves network communication among the internal endpoint devices and external endpoint devices. These practical applications are described below.

This disclosure contemplates a system and method for implementing a cloud-to-enterprise gateway device. The cloud-to-enterprise gateway device is configured to act as middleware between the internal network infrastructure of an organization and the public network. In an example scenario, assume that a user within the organization wants to make a call (e.g., a SIP call, a VoIP call) to a client. The user may access a list of clients from a client relationship management (CRM) application from their computing device. The list of clients and/or the CRM application may be provided and maintained by a cloud service provider.

One potential approach in routing the call from the user to the client may be through an internet service provider and voice carrier provider that the cloud service provider uses. The cloud service provider is external to the organization and uses an internet service provider and a voice carrier provider that are external to the organization. The user may initiate the call to the client from the CRM application. In this potential approach, the request to make the call to the client may be forwarded from the CRM application to the cloud service provider. The cloud service provider routes the call to the client's endpoint device using its internet carrier provider and voice carrier provider. Thus, this approach suffers from drawbacks including that the internal network infrastructure of the organization is not being utilized. Furthermore, in this approach, the organization may not have the flexibility in choosing which internet service provider and which voice carrier provider is to be used in routing the call to the client.

The current technology is not configured to implement a cloud-to-enterprise voice application gateway to allow routing calls to clients of the organization without using external internet service providers and external voice carrier providers with respect to the organization. In contrast, the cloud-to-enterprise gateway device is configured to route calls to clients of the organization without using external internet service providers and external voice carrier providers with respect to the organization.

The cloud-to-enterprise gateway device may receive a request to route a call (e.g., a SIP call, a VoIP call) from the user's cloud based application instance (e.g., the CRM application). The cloud-to-enterprise gateway device is configured to route a call based on a stimuli or trigger (e.g., a web API request, a SIP request) initiated from the cloud based application (e.g., the CRM application). In other words, the cloud-to-enterprise gateway device initiates the SIP signaling based on the received trigger initiated from the cloud based application (e.g., the CRM application. The cloud-to-enterprise gateway device may route the call from an endpoint device associated with the user to user equipment (UE) associated with the client via the internal network infrastructure of the organization.

The cloud-to-enterprise gateway device is a bridge between cloud applications (e.g., the CRM application and cloud based components) and the internal network of the organization. In another words, the cloud-to-enterprise gateway device is a bridge between the cloud application service provider and the internal network of the organization.

There may be any number of cloud service providers that provide different cloud applications and services to the organization. The cloud service provider may need to use the internal network (e.g., internal voice communication channel) of the organization. The cloud service provider may not be able to use the internal voice communication channel efficiently if the cloud service provider uses its respective internet service provider and voice carrier provider. Thus, the cloud-to-enterprise gateway device provides a bridge to enable utilizing the internal network of the organization for routing calls instead of the internet service provider and voice carrier provider of the cloud service provider.

Assume that during the call between the user and the client, the client requests to receive a particular service, e.g., opening an account, removing an account, unsubscribing from a service provided by the organization, subscribing to a service provided by the organization, or any other service. Any of these services may be either in part or completely hosted by the cloud application provider.

The user may initiate transferring the call to a contact center system where an agent who is known to provide (or associated with) the requested service type can be accessed. The call transfer may be between two internal users/agents within the organization. Without the cloud-to-enterprise gateway device, the cloud application service provider would need to make two separate calls from the external network (e.g., external public switched telephone network (PSTN)) back into the organization. This process may suffer from several drawbacks including routing the call through a long communication channel which is not efficient. The cloud-to-enterprise gateway device is configured to make the call transfer internally while allowing the user to continue to utilize the CRM application (e.g., SaaS software component) which is hosted externally with respect to the organization.

The cloud-to-enterprise gateway device receives the call transfer request from the user, e.g., when the user initiates the call transfer from the CRM application. The cloud-to-enterprise gateway device makes an availability request to the contact center system to determine which agent(s) is available for a call. The disclosed system identifies an agent who is available for a call and is associated with the requested service type. In some cases, if no agent associated with the requested service type is available for a call, the call is placed in a queue of an agent (associated with the requested service type) who has the shortest call queue. The call is delivered to the identified agent's endpoint device. For example, the call between the user and the client is transferred to the identified agent's endpoint device. Thus, the call between the client and the identified agent begins. In this manner, the cloud-to-enterprise gateway device is further configured to route back-to-back SIP calls between users, clients, and agents. The cloud-to-enterprise gateway device also provides the ability to have direct access to the internal contact center call queuing system. This obviates the need for routing the calls through PSTN, external network, and back into the internal network of the organization which as described above is not efficient.

In one embodiment, a system for establishing a network communication between two or more users comprises a network interface and a processor. The network interface is configured to receive a first request to establish a call between a first endpoint device associated with a user and an equipment device (UE) associated with a client, where the first request comprises a call address associated with the client. The processor is operably coupled with the network interface. The processor determines a status of the first endpoint device, where determining the status of the first endpoint device comprises querying a first network node configured to route calls to the first endpoint device. The processor determines that the first endpoint device is available for a call based at least in part upon the status of the first endpoint device. The processor routes a first call over a first communication channel from the processor to the first endpoint device. The processor routes a second call over a second communication channel from the processor to the UE using the call address associated with the client. The processor establishes a third call between the user and the client by merging the first call and the second call.

In summary, the disclosed system provides several practical applications and technical advantages, which include: 1) technology for routing calls (e.g., VoIP calls, SIP calls) between endpoint devices internal with respect to an organization and endpoint devices external with respect to the organization without using external internet service providers and external voice carrier providers; and 2) technology that allows a more seamless call transfer between endpoint devices by implementing the cloud-to-enterprise gateway device. For example, in the current technology, to transfer the call to an agent, a second call is made through the public network (e.g., an external voice carrier provider, a 800-number), and the second call is transferred to the designated party. However, this call transfer suffers from a long latency.

The disclosed system allows for using the internal network infrastructure of the organization to transfer calls, and thus allows for more seamless call transfers. The disclosed system may further be integrated into an additional practical application of allowing flexibility in choosing which internet service provider and which voice carrier provider is to be used in routing calls to clients of the organization.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
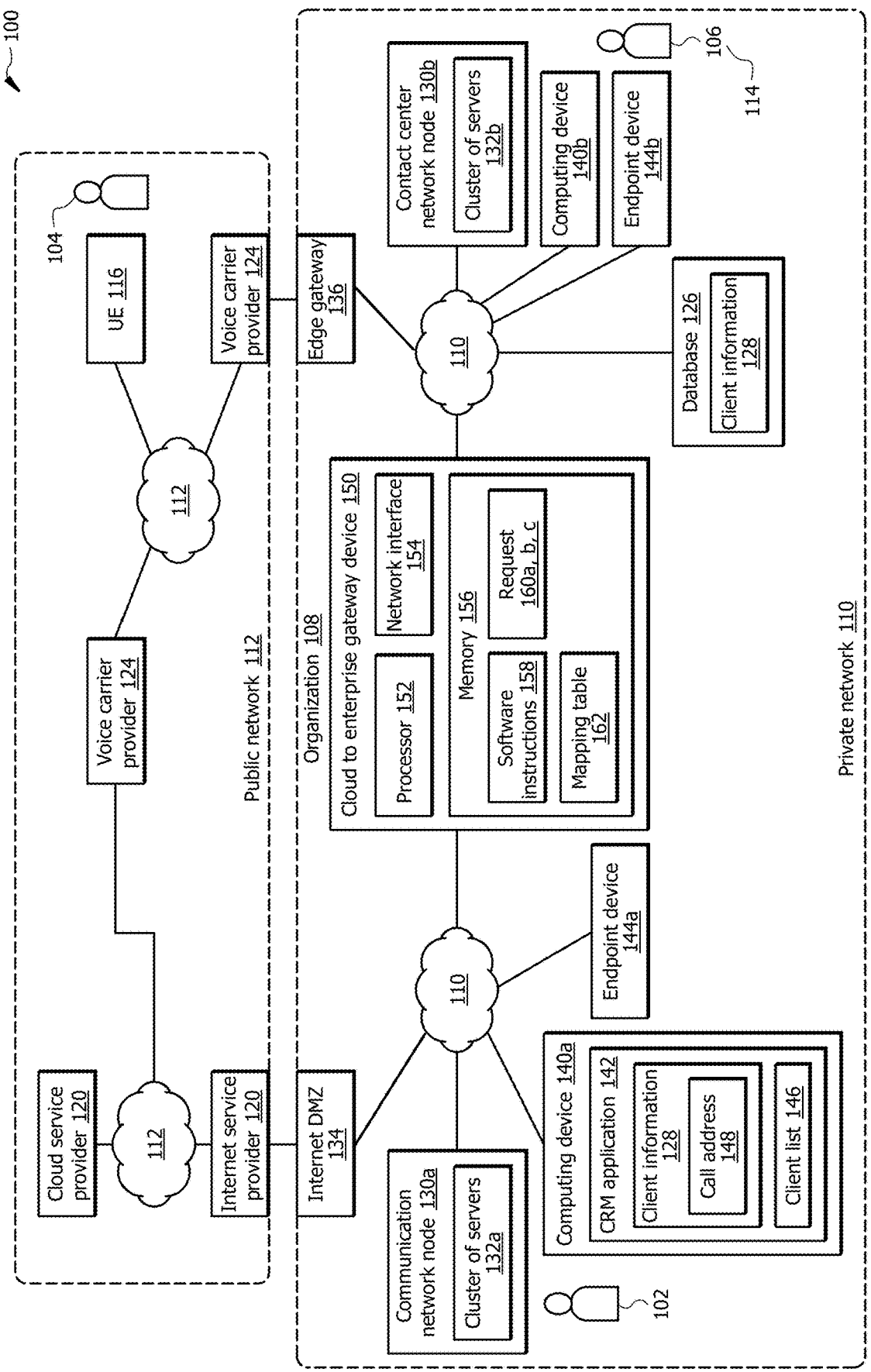
FIG. 1 illustrates an embodiment of a system configured to routing calls using a cloud-to-enterprise gateway device.
Figure 2:
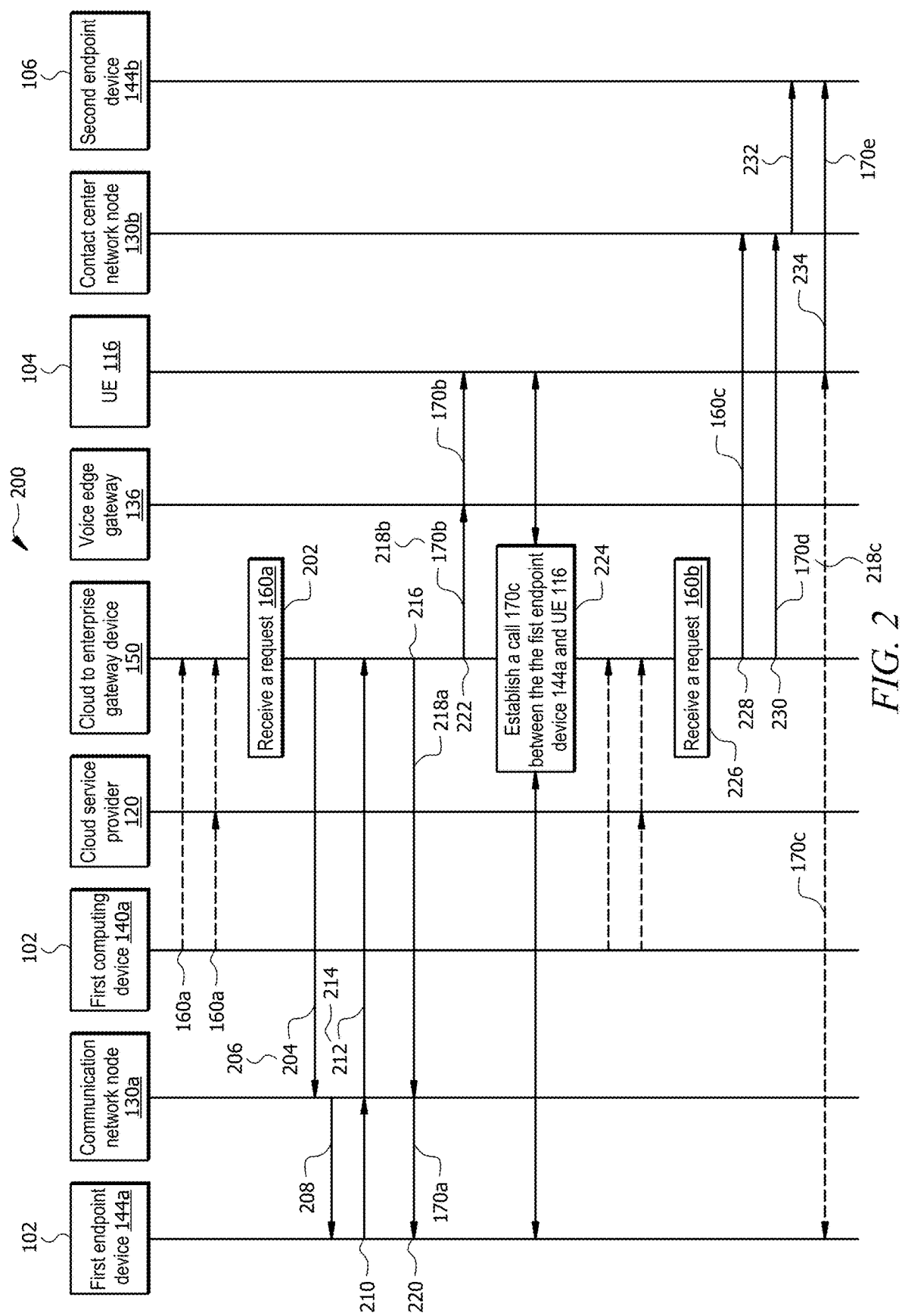
FIG. 2 illustrates an example operational flow of the system of FIG. 1.
Figure 3:
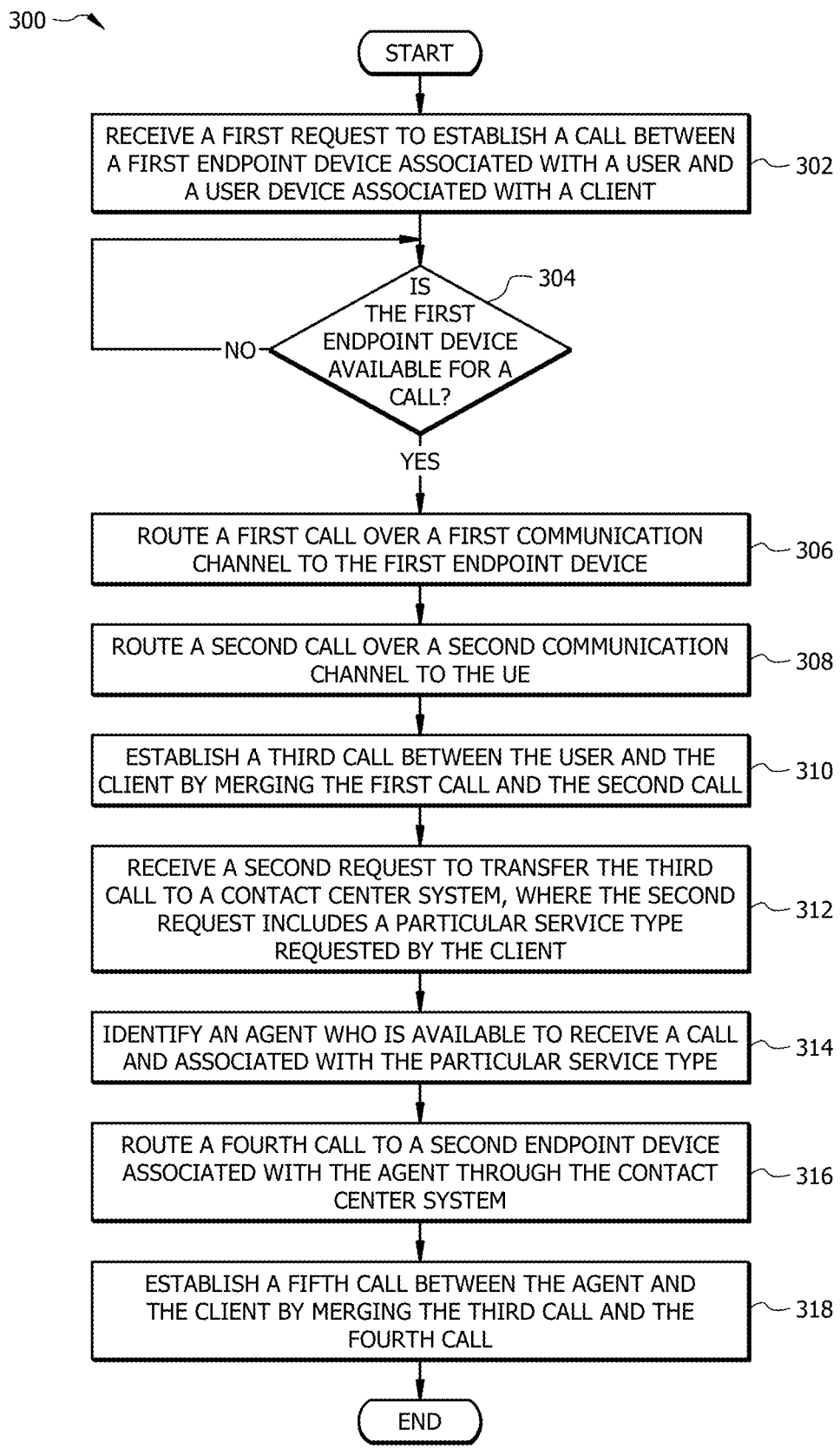
FIG. 3 illustrates an example flowchart of a method for routing calls using a cloud-to-enterprise gateway device.

As described above, previous technologies fail to provide efficient and reliable solutions to route internal and external calls utilizing the existing organization voice/communication network services while requiring the use of a cloud software service. This disclosure provides various systems and methods to route calls (e.g., session initiation protocol (SIP) calls, voice over internet protocol (VoIP) calls) using the cloud-to-enterprise gateway device. Embodiments of the present disclosure and its advantages may be understood by referring to FIGS. 1 through 3. FIGS. 1 through 3 are used to describe a system and method for implementing a cloud-to-enterprise gateway device configured to route calls between two or more uses.

Example System for Routing SIP Calls Using a Cloud-to-Enterprise Gateway Device

FIG. 1 illustrates one embodiment of a system 100 that is configured to route calls (e.g., SIP calls, VoIP calls) using a cloud-to-enterprise gateway device 150. In one embodiment, system 100 comprises the cloud-to-enterprise gateway device 150. In the present disclosure, the cloud-to-enterprise gateway device 150 may be interchangeably referred to as a gateway device 150. The gateway device 150 is communicatively coupled with components within an organization 108 via the private network 110. As shown in FIG. 1, the gateway device 150 is communicatively coupled with a communication network node 130a and contact center network node 130b, computing devices 140a and 140b, endpoint devices 142a and 142b, internet network layers (e.g., demilitarized monitoring zone (DMZ) layer 132 of the network infrastructure associated with the organization 108), and edge gateways 134. The gateway device 150 may be communicatively coupled with components in the public network 112. As shown in FIG. 1, the public network 112 may include a cloud service provider 120, an internet service provider 122, a voice carrier provider 124, and user equipment (UE) 116.

The gateway device 150 comprises a processor 152 in signal communication with a memory 156. Memory 156 stores software instructions 158 that when executed by the processor 152, cause the gateway device 150 to perform one or more operations described herein. In other embodiments, system 100 may not have all of the components listed and/or may have other elements instead of, or in addition to, those listed above.

System Components
Private Network

Private network 110 may be an internal network of an organization 108. The private network 110 may be protected from external devices using network security devices, such as firewall devices that monitor and filter incoming and outgoing network traffic based on an organization's previously established security policies.

Private network 110 may include any interconnecting system capable of transmitting audio, video, signals, data, messages, or any combination of the preceding. Private network 110 may include all or a portion of an Internet, an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a packet data network (e.g., the Internet), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near field communication (NFC) network, a Zigbee network, a Z-wave network, a WiFi network, and/or any other suitable network. Data can be communicated between the private network 110 and the publish network 112 via the internet DMZ layer 132 and/or edge gateway 136.

Public Network

Public network 112 may be an external network with respect to the organization 108. Public network 112 may include any interconnecting system capable of transmitting audio, video, signals, data, messages, or any combination of the preceding. Public network 112 may include all or a portion of an Internet, an Intranet, a peer-to-peer network, the public switched telephone network, LAN, WAN, MAN, PAN, WPAN, an overlay network, SDN, a packet data network (e.g., the Internet), a mobile telephone network (e.g., cellular networks, such as 4G or 5G), POT network, a wireless data network (e.g., WiFi, WiGig, WiMax, etc.), an LTE network, a UMTS network, a P2P network, a public switched telephone network (PSTN), a Bluetooth network, a NFC network, a Zigbee network, a Z-wave network, a WiFi network, and/or any other suitable network.

User Equipment

User equipment (UE) 116 is generally any device that is configured to communicate data with other devices. For example, the UE 116 may communicate voice-based communication data packets, video-based communication data packets, and the like. Examples of the UE 116 may include mobile devices, cellular telephones, smartphones, desktop computers, laptop computers, and the like. The UE 116 may include a user interface, such as a display, a microphone, keypad, or other appropriate terminal equipment usable by users. The UE 116 may include a hardware processor, memory, and/or circuitry configured to perform any of the functions or actions of the UE 116 described herein. For example, a software application designed using software code may be stored in the memory and executed by the processor to perform the functions of the UE 116. The UE 116 may be configured to communicate with other devices via network 112, such as PSTN. The UE 116 may be referred to herein as an endpoint device, a client device, or a user device.

Cloud Service Provider

Cloud service provider 120 may be an entity that offers network services (e.g., network applications) over a network. Examples of the network services may include an infrastructure-as-a-service (IaaS), a platform-as-a-service (PaaS), a software-as-a-service (SaaS), and managed services. The cloud service provider 120 may be associated with a cluster of servers in one or more data centers. The cluster of servers may be used to host the network service provided by the cloud service provider 120. Each server of the cluster of servers of the cloud service provider 120 may include a hardware processor, memory, and/or circuitry configured to perform any of the functions or actions of the cloud service provider 120 described herein. For example, a software application designed using software code may be stored in the memory and executed by the processor to perform the functions of the cloud service provider 120. Internet service provider 122 may be an entity that offers network communications. Voice carrier provider 124 may be an entity that offers voice communication over a network. The internet service provider 122 and voice carrier provider 124 are associated with the cloud service provider 120. The cloud service provider 120 may use the internet service provider 122 and the voice carrier provider 124 to route calls, e.g., between the user 102 and the client 104.

Database

Database 126 generally comprises any storage architecture. Examples of the database 126 include, but are not limited to, a network-attached storage cloud, a storage area network, a storage assembly directly (or indirectly) coupled to one or more components of the system 100. The database 126 stores client information 128. The client information 128 may include information associated with the clients 104 of the organization 108. For example, the client information 128 of the client 104 may include a name, a call address 148, a historical data associated with the client 104, among others. The call address 148 may include a VoIP call number, a phone number, a number, and/or code that can be used to establish a call (e.g., a VoIP call, a SIP call) to the client 104. In another example, the call address 148 may include a number and/or code that can be used to route a call (e.g., a VoIP call, a SIP call) to the client 104. The client information 128 may be accessed from the computing device 140a on the application 142.

Communication Network Node

Communication network node 130a may include a cluster of servers 132a in one or more data centers, and is generally configured to manage and oversee communications to and from one or more computing devices within the organization 108. For example, the communication network node 130a may be configured to manage and oversee communications to and from the computing device 140a. Each server of the cluster of servers 132a of the communication network node 130a may include a hardware processor, memory, and/or circuitry configured to perform any of the functions or actions of the communication network node 130a described herein. For example, a software application designed using software code may be stored in the memory and executed by the processor to perform the functions of the server 132a and thus the communication network node 130a. In the present disclosure, the communication network node 130a may interchangeably be referred to as a first network node or a communication system.

Contact Center Network Node

Contact center network node 130b may include a cluster of servers 132b in one or more data centers, and is generally configured to manage and oversee communications to and from one or more computing devices within a contact center. For example, the contact center network node 130b may be configured to manage and oversee communications to and from the computing device 140b. Each server of the cluster of servers 132b of the contact center network node 130b may include a hardware processor, memory, and/or circuitry configured to perform any of the functions or actions of the contact center network node 130b described herein. For example, a software application designed using software code may be stored in the memory and executed by the processor to perform the functions of the server 132b and thus the contact center network node 130b.

The contact center network node 130b may be configured to route calls 170 (e.g., VoIP calls, SIP calls) to a plurality of agents 106. Each group of agents 106 may be associated with a different service type 114. For example, a first group of agents 106 may be associated with a first service type 114, a second group of agents 106 may be associated with a second service type 114, and so on. Groups of agents 106 may be associated with overlapping service types 114. For example, a first group of agents 106 may be associated with a first and second service types 114, a second group of agents 106 may be associated with the second and third service types 114, and so on. In the present disclosure, the contact center network node 130b may interchangeably be referred to as a second network node or a contact center system.

Edge Gateway

Edge gateway 136 may include a network node equipped for interfacing with another network utilizing different communication protocols. The edge gateway(s) 136 may be deployed in a public network 112, a private network 110 (e.g., as shown in FIG. 1), Internet service provider (ISP) peering points and/or application service peering points that serve as aggregation points for multiple edges. The edge gateway 136 may be located at peering points in public network 112, and a private network 110 (e.g., as shown in FIG. 1).

The edge gateway 136 may provide entry points into an enterprise (e.g., organization 108) or service provider networks. Example edge gateway devices 136 can include routers, routing switches, integrated access devices (IADs), multiplexers, and a variety of MAN and WAN access devices. In one example, edge device 136 can be deployed as a powered mobile device that can be attached to end-user devices (e.g. laptops, desktops, wearable computers, tablet computers, and the like via universal serial bus (USB)). In some examples, edge device 136 may include device software that directly interacts with a host device operating system. In one example, the edge device 136 may be a virtual machine. A virtual machine can be a software-based emulation of a computer. In some examples, edge device 136 can straddle the 'bottleneck' section of a communication network (e.g., the 'last-mile'—a final leg of communication networks delivering communications connectivity to a network host such as an enterprise computing system, e.g., the gateway device 150, network 110).

Computing Device

Each of the computing devices 140a and 140b may be an instance of a computing device 140. The computing device 140 is generally any device that is configured to process data and interact with users. Examples of the computing device 140 include, but are not limited to, a personal computer, a desktop computer, a workstation, a server, a laptop, a tablet computer, etc. The computing device 140 may include a user interface, such as a display, a microphone, keypad, or other appropriate terminal equipment usable by users. The computing device 140 may include a hardware processor, memory, and/or circuitry configured to perform any of the functions or actions of the computing device 140 described herein. For example, a software application designed using software code may be stored in the memory and executed by the processor to perform the functions of the computing device 140.

The computing device 140a may store a client relationship management (CRM) application 142. The CRM application 142 may be accessible to the user 102 from a display screen of the computing device 140a. The CRM application 142 may include user interfaces that the user 102 can interact with. The CRM application 142 may be used to access the client information 128, a client list 146, and other information. For example, the CRM application 142 may display a list of potential and/or existing clients of the organization 108 (i.e., client list 146).

The CRM application 142 may be associated with the cloud service provider 120. For example, the cloud service provider 120 may provide the CRM application 142 as a platform in which users 102 can access the client information 128 and the client list 146. The CRM application 142 may include user interfaces that allow initiating calls with clients 104 for the client list 146 displayed on the CRM application 142. For example, the user 102 can initiate a call (e.g., a VoIP call, a SIP call) to a particular client 104 from the client list 146 via the CRM application 142 by selecting the particular client 104 and pressing a "call" button on the CRM application 142.

One potential approach to route a call to the client 104 may be as follows. In an example scenario, the user 102 may initiate a call to the UE 116 associated with the client 104 from the CRM application 142, similar to that described above. The CRM application 142 transfers the call request to the cloud service provider 120 via the internet DMZ layer 134 and the internet service provider 122. The cloud service provider 120 may establish the call with the UE 116 using the voice carrier provider 124. However, this approach may suffer from multiple drawbacks. For example, in this approach, the call request which may include information associated with the client 104 (e.g., call address 148 of the client 104) is exposed to the public network 112. This may lead to the information associated with the client 104 (e.g., call address 148 of the client 104) to become vulnerable to cyberattacks. In another example, in this approach, the organization 108 is charged with routing costs of the call using the internet service provider 122 and the voice carrier provider 124 which the cloud service provider 120 uses to route the call to the client 104. Thus, the organization 108 may have to use whatever internet service provider 122 and voice carrier provider 124 that the cloud service provider 120 uses in routing the call to the client 104. Furthermore, in the approach, the organization 108 may not have the flexibility in choosing which internet service provider 122 and which voice carrier provider 124 in routing the call to the client 104.

Accordingly, system 100 may be configured to implement the cloud-to-enterprise gateway device 150 that acts as middleware between the cloud service provider 120 and the internal network infrastructure of the organization 108. The gateway device 150 may facilitate call routings between internal and external entities (e.g., between the user 102 and the client 104) without using external internet service providers 122 and external voice carrier providers 124. Thus, the gateway device 150 may allow signaling in the call routings using the internal network infrastructure 110.

In another example scenario, assume that the call is established between the user 102 and the client 104, and the client 104 requests a particular service. The user 102 may need to transfer the call to an agent 106 who is known to provide the particular service. Similar to that described above, one potential approach may be via the cloud service provider 120, internet service provider 122, and the voice carrier provider 124. However, this approach may suffer from the drawbacks described above. Accordingly, the gateway device 150 may be configured to transfer the call, and establish a second call between the client 104 and the agent 106. Thus, the gateway device 150 may allow a more seamless call transfer between parties (e.g., from between user 102 and client 104 to between the client 104 and the agent 106) without using external internet service provider 122 and voice carrier provider 124. These operations of the gateway device 150 are described in greater detail in FIGS. 2 and 3.

Endpoint Device

Each of the endpoint device 144a and 144b may be an instance of an endpoint device 144. The endpoint device 144 is generally any device that is configured to send and receive calls, such as SIP calls, voice over internet protocol (VoIP) calls via network 110 and/or network 112. The endpoint device 144 may be configured to communicate voice-based communication data packets, video-based communication data packets, and the like with other devices. Examples of the endpoint device 144 may include digital phones, SIP phones, VoIP phones, and the like. The endpoint device 144 may include user interfaces, such as buttons, dials, a phone handle, a speaker, a microphone, a keypad, a display, and/or other appropriate terminal equipment usable by users. The endpoint device 144 may include a hardware processor, memory, and/or circuitry configured to perform any of the functions or actions of the endpoint device 144 described herein. For example, a software application designed using software code may be stored in the memory and executed by the processor to perform the functions of the endpoint device 144.

Cloud-to-Enterprise Gateway Device

The cloud-to-enterprise gateway device 150 may include a server or a cluster of servers, and is generally configured to route calls (e.g., VoIP calls, SIP calls, and the like) among endpoint devices 144 and UEs 116. For example, the gateway device 150 may be configured to route calls between endpoint devices 144a and UE 116. In another example, the gateway device 150 may be configured to route calls between UE 116 and endpoint device 144b. In another example, the gateway device 150 may be configured to route calls between the endpoint device 144a, UE 116, and endpoint device 144b.

In one embodiment, the gateway device 150 may be configured for voice applications and route voice calls (e.g., voice SIP calls, voice VoIP calls). In another embodiment, the gateway device 150 may be configured for voice and video applications and route voice and video calls (e.g., voice and video SIP calls, voice and video VoIP calls).

The gateway device 150 may act as middleware between the cloud service provider 120 and the internal network infrastructure of the organization 108. In this manner, the gateway device 159 may route calls between the internal endpoint device 144 and external UEs 116 using internal network 110 and without using external internet service providers 122 and external voice carrier providers 124. The gateway device 150 may be configured to use web application programming interface (API) protocols, such as web service requests, HTTPS service requests, and the like.

The gateway device 150 may receive a request to route a call (e.g., a SIP call, a VoIP call) from the user's cloud based application instance (e.g., the CRM application 142). The gateway device 150 is configured to route a call based on a stimuli or trigger (e.g., a web API request, a SIP request) initiated from the cloud based application (e.g., the CRM application 142). In other words, the gateway device 150 initiates SIP signaling based on the received trigger initiated from the cloud based application (e.g., the CRM application 142). Initial calls to the gateway device 150 are by web APIs. The web APIs may be utilized by the cloud service provider 120 either internal to the network 110 or from the external network 112.

The gateway device 150 is a bridge between cloud applications (e.g., the CRM application 142 and cloud based components) and the internal network 110 of the organization 108. In another words, the gateway device 150 is a bridge between the cloud application service provider 120 and the internal network 110 of the organization 108.

There may be any number of cloud service providers 120 that provide different cloud applications 142 and cloud services to the organization 108. The cloud service provider 120 may need to use the internal network 110 (e.g., internal voice communication channel) of the organization. 108 The cloud service provider 120 may not be able to use the internal voice communication channel efficiently if the cloud service provider 120 uses its respective internet service provider and voice carrier provider. Thus, the gateway device 150 provides a bridge to enable utilizing the internal network 110 of the organization 108 for routing calls instead of the internet service provider and voice carrier provider of the cloud service provider 120.

The gateway device 150 may be configured to determine a destination of an incoming call (e.g., VoIP call, SIP call, and the like) based on the information associated with the incoming call, such as a header, a call address, and flag data associated with the incoming call.

The gateway device 150 may include the processor 152 in signal communication with the memory 156 and the network interface 154. The processor 152 may include one or more processing units that perform various functions of the gateway device 150 described herein. The memory 156 may store software instructions 158 that when executed by the processor 152 cause the gateway device 150 to perform one or more functions described herein.

Processor 152 comprises one or more processors operably coupled to the memory 156. The processor 152 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processor 152 may be a programmable logic device, a microcontroller, a microprocessor, or any suitable combination of the preceding. The processor 152 is communicatively coupled to and in signal communication with the network interface 154 and memory 156. The one or more processors may be configured to process data and may be implemented in hardware or software. For example, the processor 152 may be 8-bit, 16-bit, 32-bit, 64-bit, or of any other suitable architecture. The processor 152 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors may be configured to implement various instructions. For example, the one or more processors may be configured to execute software instructions 158 to implement the functions disclosed herein, such as some or all of those described with respect to FIGS. 1-3. In some embodiments, the function described herein is implemented using logic units, FPGAs, ASICs, DSPs, or any other suitable hardware or electronic circuitry.

Network interface 154 is configured to enable wired and/or wireless communications. The network interface 154 may be configured to communicate data between the autonomous vehicle 402 and other devices, systems, or domains. For example, the network interface 154 may comprise an NFC interface, a Bluetooth interface, a Zigbee interface, a Z-wave interface, a radio-frequency identification (RFID) interface, a WIFI interface, a LAN interface, a WAN interface, a MAN interface, a PAN interface, a WPAN interface, a modem, a switch, and/or a router. The processor 152 may be configured to send and receive data using the network interface 154. The network interface 154 may be configured to use any suitable type of communication protocol as would be appreciated by one of ordinary skill in the art.

The memory 156 may be volatile or non-volatile and may comprise read-only memory (ROM), random-access memory (RAM), ternary content-addressable memory (TCAM), dynamic random-access memory (DRAM), and static random-access memory (SRAM). The memory 156 may include one or more of a local database, cloud database, network-attached storage (NAS), etc. The memory 156 comprises one or more disks, tape drives, or solid-state drives, and may be used as an over-flow data storage device, to store programs when such programs are selected for execution, and to store instructions and data that are read during program execution. The memory 156 may store any of the information described in FIGS. 1-3 along with any other data, instructions, logic, rules, or code operable to implement the function(s) described herein when executed by processor 152. For example, the memory 156 may store software instructions 158, requests 160a, b, and c, a mapping table 162, and/or any other data/instructions. The software instructions 158 include code that when executed by the processor 152 causes the gateway device 150 to perform the functions described herein, such as some or all of those described in FIGS. 1-3.

Operational Flow

FIG. 2 illustrates an example operational flow 200 of the system 100 of FIG. 1 for routing calls 170 between endpoint devices 144a, 144b, and UE 116 using the gateway device 150. In an example operation, assume that the user 102 wants to make a call 170 to the client 104. The call 170 may be a SIP call, a VoIP call, and the like. The user 102 may access a list of clients 104 (i.e., client list 146) on the CRM application 142 from the computing device 140a. The user 102 may select the client 104 on the CRM application 142 and initiate the call request 160a to the client 104 by pressing a button (e.g., "call" button) on the CRM application 142. The call request 160a may include a call address 148 associated with the client 104. The call address 148 may be associated with the UE 116 of the client 104.

Receiving a Request to Make a Call to a Client

The operational flow 200 begins at 202 where the gateway device 150 receives a request 160a to establish a call 170 between the endpoint device 144a associated with the user 102 and the UE 116 associated with the client 104. In other words, the gateway device 150 receives a request 160a to route the call 170 from the user's cloud based application instance (e.g., the CRM application 142). The gateway device 150 initiates SIP signaling based on the received trigger (e.g., the request 160a) initiated from the cloud based application (e.g., the CRM application 142).

In one embodiment, the gateway device 150 may receive the call request 160a from the cloud service provider 120. In this embodiment, upon the user 102 initiating the call request 160a to make a call 170 to the client 104, the CRM application 142 may forward the call request 160a to the cloud service provider 120. For example, the CRM application 142 (via the computing device 140a) may send a web service request (e.g., HTTPS web service request) to the cloud service provider 120. The cloud service provider 120 may forward the call request 160a to the gateway device 150. For example, the cloud service provider 120 may use a web service request (e.g., HTTPS web service request) to forward the call request 160a to the gateway device 150.

In an alternative embodiment, the gateway device 150 may receive the call request 160a directly from the computing device 40a. In this embodiment, upon the user 102 initiating the call request 160a to make a call 170 to the client 104, the CRM application 142 may forward the call request 160a to the gateway device 150. For example, the CRM application 142 (via the computing device 140a) may use a web service request (e.g., HTTPS web service request) to send the call request 160a to the gateway device 150.

Routing a First Call Between the User'S Device and the Communication System

To route a call 170 from the endpoint device 144a to the UE 116, the gateway device 150 may need to determine the status of the endpoint device 144a. In other words, the gateway device 150 may determine whether the endpoint device 144a is available for a call 170 or it is busy. To this end, at 204, the gateway device 150 queries the communication node 130a to determine whether the endpoint device 144a is available for a call 170 or it is busy. For example, the gateway device 150 may send a query request 206 to the communication device 130a to determine whether the endpoint device 144a is available for a call 170 or busy.

In one embodiment, querying the communication network node 130a may include sending a computer-telephony integration (CTI) API request to the communication network node 130a. The CTI API is configured to control functionalities of a telephone device from a computing device, e.g., a computing device associated with the communication device 130a. The gateway device 150 may query the communication network node 130a through a CTI link. In this process, the gateway device 150 may implement CTI API, telephone server API (TSAPI), Java technology API (JTAPI), and/or any other suitable APIs.

The communication device 130a may send a message 208 to the endpoint device 144a to determine whether the endpoint device 144a is available for a call 170 or is busy. If the endpoint device 144a is available for a call 170, it sends an acknowledgment message 210 back to the communication network node 130a. Otherwise, the endpoint device 144a may not send an acknowledgment message 210 to the communication network node 130a. For example, assume that the endpoint device 144a is available for a call 170 and sends the acknowledgment message 210 to the communication device 130a.

At 212, the gateway device 150 receives a message 214 from the communication device 130a indicating that the endpoint device 144a is available for a call 170.

At 216, a call 170a (e.g., a VoIP call, a SIP call) is placed from the gateway device 150 to the communication device 130a. The gateway device 150 routes the call 170a from the gateway device 150 to the communication device 130a. The gateway device 150 may use SIP trunks to place the SIP call 170a. SIP trunks are virtual phone lines that enable making and receiving calls 170 over the internet. SIP trunks utilize a packet switch network, in which voice calls are broken down into digital packets and sent across a network to the final destination.

The gateway device 150 may route the call 170a over a communication channel 218a. The communication channel 218a may include a SIP channel, a CTI link, and the like. The SIP channel has the capability to support incoming and outgoing SIP calls 170a. Every SIP trunk may contain a number of SIP channels.

At 220, the communication device 130a forwards the call 170a to the endpoint device 144a. Thus, media (e.g., voice, video) data packets are held between the endpoint device 144a and the computing devices (e.g., media data packets sending and receiving devices) of the communication device 130a. In this process, the gateway device 150 (and/or the communication device 130a) may use an endpoint protocol, including SIP, H.323, and any other suitable endpoint protocol.

Routing a Call Between the Gateway Device and the Client'S UE

At 222, a call 170b (e.g., a VoIP call, a SIP call) is placed from the gateway device 150 to the network 112 (e.g., PSTN) through the edge gateway 136 to the UE 116. In this process, the gateway device 150 may route the call 170b between the gateway device 150 and the UE 116. The gateway device 150 may route the call 170b over a communication channel 218b. The communication channel 218b may include a SIP channel, a CTI link, and the like. The gateway device 150 may use the call address 148 associated with the client 104 (and the UE 116) to route the call 170b to the UE 116.

Merging the Calls Between the Agent and the Client

At 224, the gateway device 150 establishes a call 170c (e.g., a VoIP call, a SIP call) between the endpoint device 144a and the UE 116 by merging the call 170a and 210b. In this process, the gateway device 150 may use SIP signaling, SIP trucking, SIP channels, and/or any suitable telecommunication protocols.

At this point, the user 102 and the client 104 are able to converse with one another on the call 170c. For example, assume that the client 104 is requesting to receive a particular service (i.e., a particular service type 114) on the call 170c. The particular service type 114 may be opening an account, removing an account, unsubscribing from a service provided by the organization 108, subscribing to a service provided by the organization 108, among other services. Any of the services 114 may be either in part or completely hosted by the cloud application provider 120. In an example scenario, assume that the client 104 wants the particular service type 114. The client 104 may request the user 102 to provide the particular service type 114. The user 102 may realize that the particular service type 114 is better provided by an agent 106 (at the contact center network node 130b) who is associated with (or known to be associated with or labeled to) the particular service type 114. Thus, the user 102 may initiate transferring the call 170c to the contact center network node 130b.

The user 102 may initiate transferring the call 170c to the contact center network node 130b from the CRM application 142. For example, the user 102 may press a "transfer call" button and choose the destination of the transfer call as the contact center system 310b on the CRM application 142.

Transferring the Call to an Agent

At 226, the gateway device 150 receives the request 160b to transfer the call 170c to the contact center network node 130b. For example, the gateway device 150 receives a request 160b to establish a call 170d between the UE 116 and the contact center network node 130b.

The call transfer may be between two internal users/agents (e.g., user 102 and agent 106) within the organization 108. Without the gateway device 150, the cloud application service provider 120 would need to make two separate calls from the external network 112 (e.g., PSTN) back into the organization 108. This process may suffer from several drawbacks including routing the call through a long communication channel which is not efficient. The gateway device 150 is configured to make the call transfer internally while allowing the user 102 to continue to utilize the CRM application 140 (e.g., SaaS software component) which is hosted externally with respect to the organization 108. The gateway device 150 also provides the ability to have direct access to the call queuing system of the internal contact center 130. This obviates the need for routing the calls through PSTN, external network 112, and back into the internal network 110 of the organization 108 which as described above is not efficient.

In one embodiment, the gateway device 150 may receive the request 160b from the cloud service provider 120. In this embodiment, upon the user 102 initiating the request 160b, the CRM application 142 may forward the request 160b to the cloud service provider 120. For example, the CRM application 142 (via the computing device 140a) may send a web service request (e.g., HTTPS web service request) to the cloud service provider 120. The cloud service provider 120 may forward the request 160b to the gateway device 150. For example, the cloud service provider 120 may use web service request (e.g., HTTPS web service request) to forward the request 160b to the gateway device 150.

In an alternative embodiment, the gateway device 150 may receive the request 160b directly from the computing device 140a. In this embodiment, upon the user 102 initiating the request 160b on the CRM application 142, the CRM application 142 (via the computing device 140a) may forward the request 160b to the gateway device 150. For example, the CRM application 142 (via the computing device 140a) may use a web service request (e.g., HTTPS web service request) to send the request 160b to the gateway device 150.

The request 160b may include client information 128 associated with the client 104 comprising the particular service type 114 requested by the client 104 during the call 201c. For example the user 102 may add a node describing the particular service type 114 requested by the client 104 to the client information 128 associated with the client 104 on the CRM application 142. The user 102 may include the note describing the particular service type 114 to the request 160b. The user 102 may add other notes to the request 160b, such as a note that indicates the client 104 is a prospective client for the particular service type 114. Upon receiving the request 160b, the gateway device 150 may add a flag or code indicating the notes added to the request 160b.

At 228, the gateway device 150 makes an availability request 160c to the contact center network node 130b, e.g., over a CTI link. In this process, the gateway device 150 may implement a CTI API, TSAPI, JTAPI, and/or any other suitable APIs.

The gateway device 150 may need to identify which agent(s) 106 is associated with the particular service type 114 requested by the client 104. To this end, the gateway device 150 may access a mapping table 162 that comprises a mapping between agents 106 and their respective service types 114 that they provide (or associated with). In this process, the gateway device 150 may identify at least one agent 106 who is associated with the particular service type 114.

The gateway device 150 queries the contact center network node 130*b* to determine which agent 106 from among the at least one agent 106 (who is identified to be associated with the requested service type 114) is available to receive a call 170. In one embodiment, querying the contact center network node 130*b* may include sending a CTI API request to the contact center network node 130*b*. The CTI API is configured to control functionalities of a telephone device from a computing device, e.g., a computing device associated with the contact center network node 130*b*.

At 230, a call 170*d* (e.g., VoIP call, SIP call) is made from the gateway device 150 to the contact center network node 130*b*. The gateway device 150 may route the call 170*d* from the gateway device 150 to the contact center network node 130*b* over a communication channel 218*c*. The communication channel 218*c* may include a SIP channel, a CTI link, etc.

At 232, the call 170*d* is delivered to the endpoint device 144*b* associated with the agent 106 who is determined to be available to receive a call 170 and is identified to be associated with the requested service type 114. In this process, the gateway device 150 (and/or the contact center network node 130*b*) routes the call 170*d* to the endpoint device 144*b*, e.g., over the communication channel 218*c*. In this process, the gateway device 150 (and/or the contact center network node 130*b*) may use an endpoint protocol, including SIP, H.323, and any other suitable endpoint protocol.

In one embodiment, if none of the agents 106 (who is identified to be associated with the requested service type 114) is available to receive a call 170, the call 170*c* may be placed in a queue associated with an agent 106 (who is identified to be associated with the requested service type 114) who has the shorted call queue.

At 234, a call 170*e* is established between the UE 116 and the endpoint device 144*b* by merging the calls 170 made to the UE 116 and endpoint device 144*b* described above.

In one embodiment, the gateway device 150 may merge the calls 170 made to the user 102, the client 104, and the agent 106 such that they can converse with one another in a conference call 170. In this process, the gateway device 150 may merge the calls 170 routed to the endpoint device 144*a*, UE 116, and endpoint device 144*b*.

In some cases, the user 102 may want to drop off from the call 170 with the client 104. Thus, the user 102 may initiate disconnecting the call 170 with the client 104. Thus, in one embodiment, the gateway device 150 may disconnect the call 170*c* between the user 102 and the client 104.

Any client information 128 that was collected and/or modified during the interaction with the client 104 as well as the client information 128 that was previously associated with the client 104 may be made available to the agent 106, e.g., on the endpoint device 144*b*.

Example Method for Routing Calls Between Two or More Users

FIG. 3 illustrates an example flowchart of a method 300 for routing calls between two or more users. Modifications, additions, or omissions may be made to method 300. Method 300 may include more, fewer, or other steps. For example, steps may be performed in parallel or in any suitable order. While at times discussed as the system 100, gateway device 150, processor 152, or components of any of thereof performing operations, any suitable system or components of the system may perform one or more operations of the method 300. For example, one or more operations of method 300 may be implemented, at least in part, in the form of software instructions 158 of FIG. 1, stored on non-transitory, tangible, machine-readable media (e.g., memory 156 of FIG. 1) that when run by one or more processors (e.g., processor 152 of FIG. 1) may cause the one or more processors to perform operations 302-318.

At 302, the gateway device 150 receives a request 160*a* to establish a call 170 between a first endpoint device 144*a* associated with the user 102 and the UE 116 associated with the client 104. For example, the gateway device 150 may receive the request 160*a* when the user 102 initiates the request 160*a* from the CRM application 142, similar to that described in FIG. 2.

At 304, the gateway device 150 determines whether the endpoint device 144*a* is available for a call 170. In this process, the gateway device 150 may send a query request to the communication network node 130*a*, similar to that described in FIG. 2. If it is determined that the endpoint device 144*a* is available for a call 170, method 300 proceeds to 306. Otherwise, method 300 remains at 304 until the endpoint device 144*a* become available for a call 170.

At 306, the gateway device 150 routes a first call 170 over a first communication link 218 to the endpoint device 144*a*, similar to that described in FIG. 2. The communication link 218 may include a SIP channel, a CTI link, etc.

At 308, the gateway device 150 routes a second call 170 over a second communication channel 218 to the UE 116. The gateway device 150 may route the second call 170 to the UE 116 via the edge gateway 136 and network 112, e.g., PSTN.

At 310, the gateway device 150 establishes a third call 170 between the user 102 and the client 104 by merging the calls 170 made to the endpoint device 144*a* and the UE 116, similar to that described in FIG. 2.

At 312, the gateway device 150 receives a second request 160*b* to transfer the third call 170 to a contact center network node 130*b*, where the second request 160*b* includes a particular service 114 requested by the client 104. The gateway device 150 may receive the second request 160*b* when the user 102 initiates the second request 160*b* from the CRM application 142, similar to that described in FIG. 2.

At 314, the gateway device 150 identifies an agent 106 who is available to receive a call 170 and associated with the particular service type 114. In this process, the gateway device 150 may use the mapping table 162 to determine which agent(s) 106 is associated with the particular service type 114. The gateway device 150 may query the contact center network node 130*b* to determine the availability of agents 106 (or availability endpoint devices 144*b* associated with the agents 106), similar to that described in FIG. 2.

At 316, the gateway device 150 routes a fourth call 170 to an endpoint device 144*b* associated with the identified agent 106 through the contact center network node 130*b*, similar to that described in FIG. 2.

At 318, the gateway device 150 establishes a fifth call 170 between the agent 106 and the client 104 by merging the third call 170 and the fourth call 170. The call 170 is delivered to the endpoint device 144*b* of the identified agent 106 (e.g., via the gateway device 150 and/or the contact center network node 130*b*). In one embodiment, the calls 170 between the user 102, the client 104, and the agent 106 may be merged in a conference call 170. In another embodiment, the call 170 between the user 102 and the client 104 may be disconnected (upon receiving a request from the user 102 to the gateway device 150).

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for establishing a network communication between two or more users comprising:
    a network interface configured to receive a first request to establish a call between a first endpoint device associated with a user and an equipment device (UE) associated with a client, wherein the first request comprises a call address associated with the client; and
    a processor operably coupled with the network interface, the processor configured to:
        determine a status of the first endpoint device, wherein determining the status of the first endpoint device comprises querying a first network node configured to route calls to the first endpoint device;
        determine that the first endpoint device is available for a call based at least in part upon the status of the first endpoint device;
        route a first call over a first communication channel from the processor to the first endpoint device, wherein the first communication channel is established using a private network infrastructure of the system;
        route a second call over a second communication channel from the processor to the UE using the call address associated with the client, wherein the second communication channel is established using the private network infrastructure of the system; and
        establish a third call between the user and the client by merging the first call and the second call.

2. The system of claim 1, wherein the processor is further configured to:
    receive a second request to establish a fourth call between the UE associated with the client and a second network node, wherein:
        receiving the second request is in response to the client requesting to receive a particular service type on the third call;
        the second network node is configured to route calls to a plurality of agents;
        each group of agents from among the plurality of agents is associated with a different service type;
        the second request comprises client information comprising the particular service type;
    identify at least one agent from among the plurality of agents who is associated with the particular service type;
    query the second network node to determine which agent from among the at least one agent is available to receive a call;
    identify a particular agent from among the at least one agent who is available to receive the call;
    route the fourth call over a third communication channel between the processor and a third endpoint device associated with the particular agent; and
    establish a fifth call between the particular agent and the client by merging the third call and the fourth call.

3. The system of claim 2, wherein the processor is further configured to merge the third call and the fifth call between the user, the client, and the particular agent.

4. The system of claim 3, wherein the processor is further configured to disconnect the third call in response to establishing the fifth call.

5. The system of claim 2, wherein:
    the first request is received from a computing device associated with the user;
    the second request is received from the computing device; and
    the computing device comprises a desktop computer.

6. The system of claim 1, wherein:
    the first endpoint device comprises a session initiation protocol (SIP) phone associated with the user; and
    the UE comprises a telephone device associated with the client.

7. The system of claim 1, wherein:
    querying the first network node comprises sending a first computer-telephony integration (CTI) application programming interface (API) request to the first network node; and
    the first CTI API is configured to control functionalities of a telephone device from a computing device associated with the first network node.

8. A method for establishing a network communication between two or more users comprising:
    receiving, by a network interface, a first request to establish a call between a first endpoint device associated with a user and an equipment device (UE) associated with a client, wherein the first request comprises a call address associated with the client;
    determining, by a processor operably coupled with the network interface, a status of the first endpoint device, wherein determining the status of the first endpoint device comprises querying a first network node configured to route calls to the first endpoint device;
    determining, by the processor, that the first endpoint device is available for a call based at least in part upon the status of the first endpoint device;
    routing, by the processor, a first call over a first communication channel from the processor to the first endpoint device, wherein the first communication channel is established using a private network infrastructure of a system associated with the processor;

routing, by the processor, a second call over a second communication channel from the processor to the UE using the call address associated with the client, wherein the second communication channel is established using the private network infrastructure of the system; and establishing, by the processor, a third call between the user and the client by merging the first call and the second call.

9. The method of claim 8, further comprising:

receiving a second request to establish a fourth call between the UE associated with the client and a second network node, wherein:

receiving the second request is in response to the client requesting to receive a particular service type on the third call;

the second network node is configured to route calls to a plurality of agents;

each group of agents from among the plurality of agents is associated with a different service type;

the second request comprises client information comprising the particular service type;

identifying at least one agent from among the plurality of agents who is associated with the particular service type;

querying the second network node to determine which agent from among the at least one agent is available to receive a call;

identifying a particular agent from among the at least one agent who is available to receive the call;

routing the fourth call over a third communication channel between the processor and a third endpoint device associated with the particular agent; and establishing a fifth call between the particular agent and the client by merging the third call and the fourth call.

10. The method of claim 9, further comprising merging the third call and the fifth call between the user, the client, and the particular agent.

11. The method of claim 10, further comprising disconnecting the third call in response to establishing the fifth call.

12. The method of claim 9, wherein:

the first request is received from a computing device associated with the user;

the second request is received from the computing device; and the computing device comprises a desktop computer.

13. The method of claim 9, wherein:

querying the second network node comprises sending a second computer-telephony integration (CTI) application programming interface (API) request to the second network node associated with the second network node; and the second CTI API is configured to control functionalities of a telephone device from a computing device.

14. The method of claim 8, wherein a session initiation protocol (SIP) is used in establishing the first call.

15. A non-transitory computer-readable medium storing instructions that when executed by a processor cause the processor to:

receive, via a network interface operably coupled to the processor, a first request to establish a call between a first endpoint device associated with a user and an equipment device (UE) associated with a client, wherein the first request comprises a call address associated with the client; and determine a status of the first endpoint device, wherein determining the status of the first endpoint device comprises querying a first network node configured to route calls to the first endpoint device;

determine that the first endpoint device is available for a call based at least in part upon the status of the first endpoint device;

route a first call over a first communication channel from the processor to the first endpoint device, wherein the first communication channel is established using a private network infrastructure of a system associated with the processor;

route a second call over a second communication channel from the processor to the UE using the call address associated with the client, wherein the second communication channel is established using the private network infrastructure of the system; and establish a third call between the user and the client by merging the first call and the second call.

16. The non-transitory computer-readable medium of claim 15, wherein the instructions further cause the processor to:

receive a second request to establish a fourth call between the UE associated with the client and a second network node, wherein:

receiving the second request is in response to the client requesting to receive a particular service type on the third call;

the second network node is configured to route calls to a plurality of agents;

each group of agents from among the plurality of agents is associated with a different service type;

the second request comprises client information comprising the particular service type;

identify at least one agent from among the plurality of agents who is associated with the particular service type;

query the second network node to determine which agent from among the at least one agent is available to receive a call;

identify a particular agent from among the at least one agent who is available to receive the call;

route the fourth call over a third communication channel between the processor and a third endpoint device associated with the particular agent; and establish a fifth call between the particular agent and the client by merging the third call and the fourth call.

17. The non-transitory computer-readable medium of claim 16, wherein the instructions further cause the processor to merge the third call and the fifth call between the user, the client, and the particular agent.

18. The non-transitory computer-readable medium of claim 17, wherein the instructions further cause the processor to disconnect the third call in response to establishing the fifth call.

19. The non-transitory computer-readable medium of claim 16, wherein:

the first request is received from a computing device associated with the user;

the second request is received from the computing device; and the computing device comprises a desktop computer.

20. The non-transitory computer-readable medium of claim 15, wherein:

the first endpoint device comprises a session initiation protocol (SIP) phone associated with the user; and the UE comprises a telephone device associated with the client.

* * * * *